Dec. 25, 1928.
J. PHILLIPS
1,696,449
ADJUSTABLE GROUSER WHEEL
Filed March 26, 1927
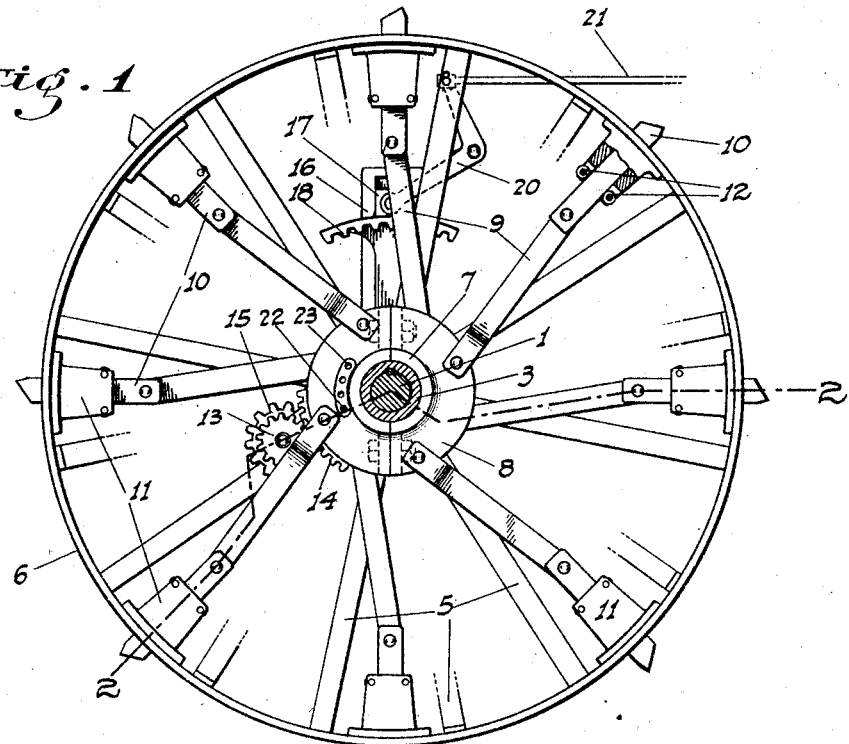
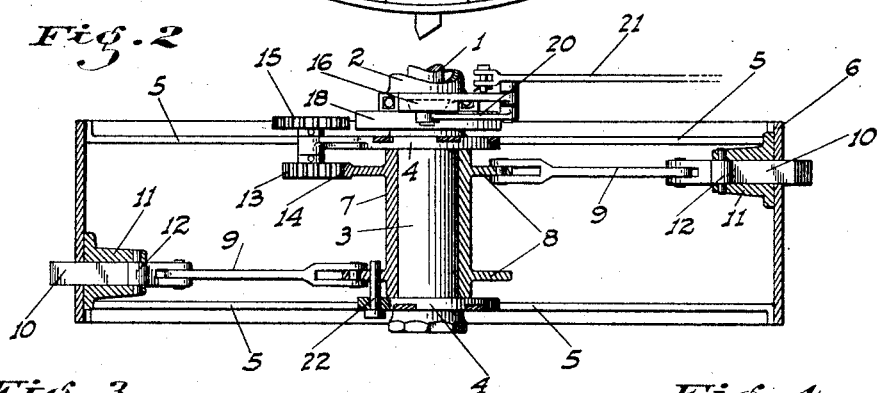
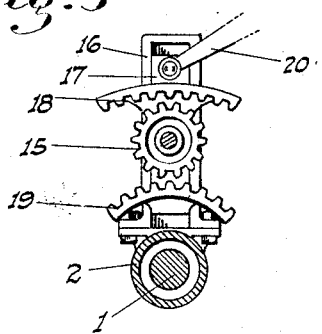
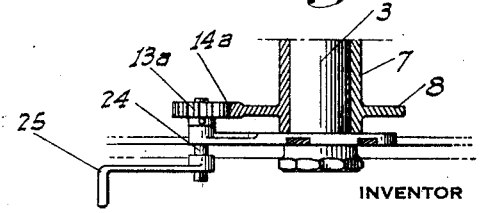
INVENTOR
J. Phillips
BY
ATTORNEY Patented Dec. 25, 1928.

1,696,449

UNITED STATES PATENT OFFICE.

JOSEPH PHILLIPS, OF GUADALUPE, CALIFORNIA.

ADJUSTABLE GROUSER WHEEL.

Application filed March 26, 1927. Serial No. 178,584.

This invention relates to improvement in grouser devices for the drive wheels of tractors and other agricultural implements; my principal object being to provide an adjustable grouser arrangement for such wheels so designed that the grousers may be easily adjusted to project different distances from the periphery of the wheel as ground conditions may require; or they may be retracted so as not to project beyond said periphery in the slightest degree, thereby leaving the tread of the wheel plain and smooth.

The advantages of this feature will be obvious to those operating machines of this character. The need of grousers under certain conditions is unquestioned and yet when the machine is travelling over a hard surfaced road, permanently fixed grousers not only do no good but in fact are actually harmful as they tend to cut up the road. Some states require the grousers to be removed before the wheels may be used on the roads, which with the ordinary form of grousers means the expenditure of considerable time and effort to detach the grousers. In fact in some cases the grousers cannot be detached at all and an additional tread band must be placed around the same to obtain the required smooth ground bearing wheel surface.

With my improved arrangement the grousers may be fully retracted (which is the equivalent to their removal) in a few seconds' time and they may be advanced to any desired extent in a corresponding time.

A further object of the invention is to provide power means, actuated at the option of the operator by the rotation of the wheel for advancing or retracting the grousers.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a side elevation of a wheel with my improved power operated grouser structure thereon with the outer row of wheel spokes removed.

Fig. 2 is a sectional plan on the line 2—2 of Fig. 1.

Fig. 3 is a fragmentary elevation showing the gear segments for optional engagement with the grouser controlling pinion.

Fig. 4 is a fragmentary section showing a hand controlled means for the grousers.

Referring now more particularly to the characters of reference on the drawings, the numeral 1 denotes a drive axle projecting from a housing 2 and secured onto the hub 3 of the wheel. This hub at its extremities has outwardly projecting flanges 4 to which are secured spokes 5 which extend thence to the rim 6 of the wheel, said rim being a continuous smooth circular member of suitable diameter and width.

Turnably mounted in the hub between the flanges thereof is a sleeve member 7 having outwardly projecting flanges 8 spaced transversely a certain distance and preferably of larger diameter than the hub flanges. Pivoted onto the flanges 8 in staggered and circumferentially spaced relation are links 9 which extend thence outwardly to pivotal connections with the inner ends of radially disposed grousers 10, which are of tooth-like form. These grousers are adapted to project through the rim 6, and are also disposed in staggered and circumferentially spaced relation, corresponding to the positioning of the various links. The grousers are slidably guided in blocks 11 mounted on the inner face of the rim, rollers 12 being preferably provided in connection with the blocks to bear against the opposite sides of the grousers and reduce the friction incident to the sliding movement of the grousers when being adjusted.

The length of the grousers and link relative to the radius of the wheels is such that when the links and grousers are radially alined with the axis of the wheel, the grousers will project a predetermined maximum distance beyond the rim. It will therefore be seen that if the sleeve is rotated so as to move the link pivots on the sleeve out of radial alinement with the grousers the latter will be pulled inwardly of the rim.

The sleeve is rotated relative to the hub at will so as to alter the position of the grousers as above stated by the following structure:

Turnably supported from the inner flange 4 of the hub is a pinion 13 meshing with a segmental gear 14 provided in connection with the adjacent sleeve flange, the axis of the pinion being parallel to the wheel axle. Mounted in connection with the pinion and positioned beyond the adjacent row of spokes is another pinion 15. Fixed on the housing 2 is a radially extending guide and support 16 for a block 17 on which are mounted radially spaced segmental gears 18 and 19. The gear 18 is of the internal type to engage the outer periphery of the pinion 15 and the latter is of the external type to engage the periphery of said pinion closest to the axle 1. The radial spacing between said gears is sufficient to permit the pinion 15, with the rotation of the wheel, to pass freely therebetween without meshing with either gear. Said gears also of course are formed on arcs concentric with that of the wheel. The slide block 17 is raised or lowered, so as to place either the gear 19 or 18 in mesh with the pinion by suitable means such as a bellcrank 20 connected to the block at one end and at its other end to an operating rod 21 which may extend thence to any convenient point of operation on the machine. The length of the gears 18 and 19 is such that with the passage of the pinion 15 the full length of said gears the sleeve 7 (if the pinion is engaged with either gear) will be rotated sufficiently to fully advance or retract the grousers, as the case may be. If only partial advancement or retraction of the grousers is desired the gears are moved to a neutral position before the pinion has moved the full length thereof. The sleeve may then be held against rotative movement on the hub by a pin 22 mounted in the outer hub flange and removed projecting into any one of a number of holes 23 in the adjacent sleeve flange. The use of the two gears 18 and 19 enables the adjustment of the grousers in or out to be had with the rotation of the wheel in a single continuous direction.

If desired hand adjustment for the grousers may be provided in connection with or in place of the power adjustment means. In this case a pinion 13$^a$ is mounted in connection with the outer hub flange to engage a segmental gear 14$^a$ on the adjacent sleeve flange as shown in Fig. 4. The pinion 13$^a$ is provided with a shaft 24 projecting outwardly of the wheel and adapted to be removably engaged with a crank handle 25. With this device grouser adjusting operations are of course performed while the wheel is stationary.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In combination with a wheel, grousers disposed radially of the wheel and arranged to project through the rim thereof, a sleeve member turnable on the hub of the wheel, links pivoted onto the sleeve and onto the inner ends of the grousers, a pinion mounted in connection with the hub, gear teeth on the sleeve member meshing with the pinion, another pinion mounted in connection with said first named pinion, and a gear mounted separate from the wheel for selective engagement with said other pinion.

2. In combination with a wheel, grousers disposed radially of the wheel and arranged to project through the rim thereof, a sleeve member turnable on the hub of the wheel, links pivoted onto the sleeve and onto the inner ends of the grousers, a pinion mounted in connection with the hub, gear teeth on the sleeve member meshing with the pinion, another pinion mounted in connection with said first named pinion, radially spaced gear elements, mounted separate from but concentric with the wheel for alternate engagement with said other pinion on opposite sides thereof, and means operable at will for shifting said gears radially to place either one in the path of the teeth of said other pinion with the rotation of the wheel.

In testimony whereof I affix my signature.

JOSEPH PHILLIPS.